United States Patent [19]

Carroll, Jr.

[11] Patent Number: 4,900,611
[45] Date of Patent: Feb. 13, 1990

[54] PAINT COATED ARTICLE

[75] Inventor: John F. Carroll, Jr., Rochester, N.Y.

[73] Assignee: Eastman Kodak Company, Rochester, N.Y.

[21] Appl. No.: 267,906

[22] Filed: Nov. 7, 1988

[51] Int. Cl.⁴ .......................... B32B 5/14; B32B 5/16; B32B 19/02
[52] U.S. Cl. .................................. 428/216; 428/218; 428/219; 428/328; 428/335; 428/341
[58] Field of Search .............. 428/328, 329, 341, 332, 428/335, 336, 31, 215, 216, 218, 219

[56] References Cited

U.S. PATENT DOCUMENTS

| | | | |
|---|---|---|---|
| 3,692,731 | 9/1972 | McAdow | 260/32.8 |
| 3,932,349 | 1/1976 | Camelon et al. | 260/41.14 |
| 4,199,489 | 4/1980 | Short | 260/37 M |
| 4,213,886 | 7/1980 | Turner | 260/29.6 |
| 4,359,504 | 11/1982 | Troy | 428/403 |
| 4,403,003 | 9/1983 | Backhouse | 427/407.1 |
| 4,484,951 | 11/1984 | Uchimura et al. | 106/290 |
| 4,603,064 | 7/1986 | Kania | 427/407.1 |
| 4,611,026 | 9/1986 | Olson et al. | 524/548 |
| 4,681,881 | 7/1987 | Simpson et al. | 428/413 |
| 4,719,132 | 1/1988 | Porter, Jr. | 427/409 |
| 4,725,640 | 2/1988 | Cowles | 524/439 |

OTHER PUBLICATIONS

*Paint and Surface Coatings:* Theory and Practice, Chapter 10, "Automotive Paints", p. 466.

Primary Examiner—George F. Lesmes
Assistant Examiner—J. Davis
Attorney, Agent, or Firm—William J. Davis

[57] ABSTRACT

A paint coated article has a plurality of paint layers containing a polymeric binder and reflective flakes, such as metal flakes, coated on a substrate. Flakes in the outer layer are of relatively large average size and are present in a concentration such that the layer is light transmissive. The flakes in the inner layer are of relatively smaller average size and the coverage of the inner layer is sufficient that the total paint coating is opaque. The paint coated article has excellent distinctness of image, gloss, flop and covering power. In a particularly preferred embodiment, the paint layers are applied as coatings on a thermoformable carrier film to provide a stretchable and flexible sheet material adapted for use in a thermoforming process in which it is stretched and bonded to a three dimensional substrate, such as an exterior automobile panel, to form thereon a decorative coating exhibiting a high degree of geometric metamerism.

8 Claims, 1 Drawing Sheet

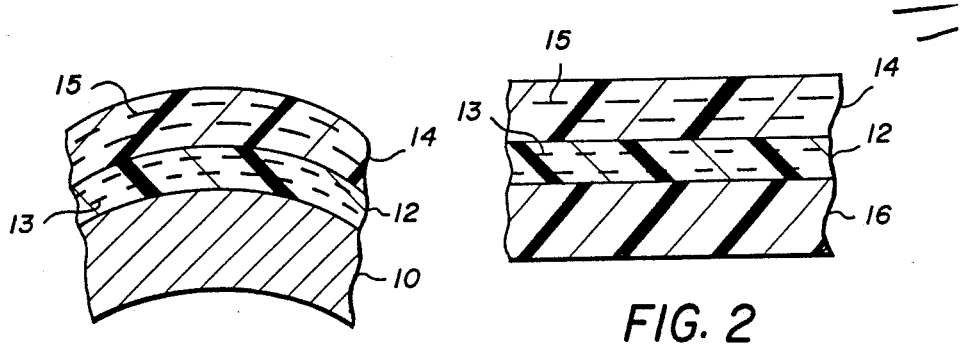
FIG. 1
FIG. 2
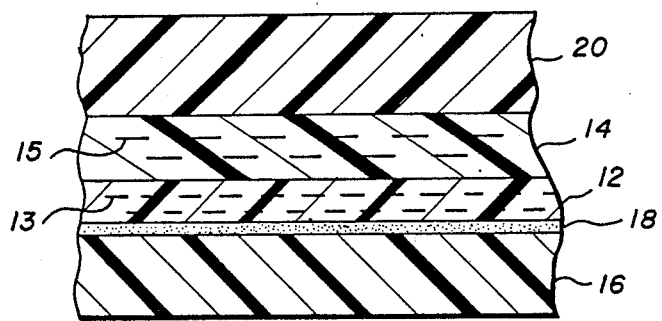
FIG. 3

PAINT COATED ARTICLE

FIELD OF THE INVENTION

This invention relates to paint coated articles, and more particularly, to such articles coated with paints which contain light reflective flakes.

BACKGROUND

Paint compositions containing light reflective flakes and colorants are used for protective and decorative coatings, for example, on automobile bodies. Such coatings accentuate the styling lines and contoured surfaces and are characterized by what is known as geometric metamerism. Geometric metamerism, also referred to as goniochromatism or "flop", is the ability of a paint film to exhibit subtle variations in color and lightness depending upon the direction from which it is viewed. This effect is produced by metal or other reflective flakes such as mica incorporated into the film at varying depths. The aesthetics of such decorative and protective coatings are further influenced by the sharpness of the image outlines. This characteristic is known in the paint industry as "distinctness of image" (DOI), or simply "gloss".

Acceptable appearance of a metallic pigmented coating further depends on the correct covering power, or optical density, provided by the metal particles. Acceptable covering power is usually defined as that which matches the appearance of a reference standard. If no such standard exists, the coating should exhibit a covering power sufficient to obscure the substrate onto which it is protectively bonded.

Typical prior art paint coatings containing reflective flakes, sometimes referred to as base coats, which are said to have a high degree of geometric metamerism are formed by the spray application of a single layer as described, e.g., in U.S. Pat. No. 4,681,811, or by the application of dual layers of identical composition as described, e.g., in U.S. Pat. No. 4,603,064 and U.S. Pat. No. 4,719,132.

Numerous attempts have been made to improve the appearance of protective and decorative paint coatings having reflective metallic flakes for use on substrates, such as automobile panels. Disclosures in the following patents are representative: U.S. Pat. Nos. 4,725,640; 4,213,886; 4,199,489; 4,611,026; 4,359,504; 3,932,349; 4,484,951; and 4,403,003. The disclosures in the above-listed patents are hereby incorporated by reference in their entirety.

These prior attempts have all had one or more disadvantages such as an undesirably high concentration of metallic flakes, the need for an added expensive ingredient, undesirably thick paint layers, inadequate flop or inadequate covering power.

An advantage of larger flake size in coating compositions containing metal flakes is suggested in U.S. Pat. No. 3,692,731, which indicates in column 1 that greater sparkle can be provided if aluminum is used in smaller amounts in the form of large insoluble resin supported flakes of increased planarity so that a greater proportion of the flakes reflect light in unison, creating more widely separated areas having increased sparkle.

However, as is indicated in *Paint and Surface Coatings: Theory and Practice*, Chapter 10, entitled "Automotive Paints", p. 466, there has been a bias against formulating automotive paints with coarse flakes (sizes up to about 30 $\mu$m) for use in basecoats due to poor opacity and the problem of flake protrusion through the basecoat surface which can result in an unacceptable seedy appearance.

Thus, the problem facing the art has been to provide a paint coating having the advantages of large flakes yet having good opacity and improved appearance.

Brief Summary of the Invention

I have solved this problem by providing certain bilayered paint coatings.

More specifically, in accordance with this invention, there is provided a paint coated article which comprises a substrate and coated on the substrate an outer paint layer and an inner paint layer. Each of the layers comprises a polymeric binder and reflective flakes dispersed therein. The flakes of the outer layer are of relatively large average size and present in a concentration such that the layer is light transmissive. The flakes of the inner layer are of relatively smaller average size. The coverage of the inner layer is sufficient that the total paint coating is opaque. These coatings have excellent distinctness of image, gloss, flop and covering power, and do not exhibit an unacceptable seedy appearance.

In a particularly preferred embodiment of this invention, the above-described paint layers are applied as coatings on a thermoformable polymeric carrier film to provide a paint coated flexible and stretchable sheet material adapted for use in a thermoforming process in which it is stretched and bonded to a three-dimensional substrate, such as an exterior automobile panel, to form thereon a decorative coating exhibiting a high degree of geometric metamerism.

BRIEF DESCRIPTION OF THE DRAWINGS

FIGS. 1–3 are fragmentary cross-sectional views of paint coated articles in accordance with this invention.

DESCRIPTION OF THE PREFERRED EMBODIMENTS

The present invention provides an improvement in the appearance of protective and decorative metallic paint layers. The coated layers provide excellent distinctness of image, gloss, flop and covering power and reduce the potential for loss of these qualities when films comprising the dried coated layers are stretched in thermoforming procedures and bonded to substrates.

In accordance with the present invention, there is provided a paint coated article which comprises a substrate, and coated on the substrate, an outer paint layer and an inner paint layer, each of the layers comprising a polymeric binder and reflective flakes dispersed therein.

As used herein the terms "outer" and "inner" are intended to define the relative space relationship of the two essential flake containing layers of the coated article of this invention. However, as will be apparent to one skilled in the art, the paint coated article can contain one or more additional layers, for example, substantially transparent layers, disposed between the substrate and the inner layer, between the inner layer and the outer layer, or over the outer layer.

An essential feature of this invention is that the flakes of the outer layer are of relatively large average size and present in a concentration such that the layer is light transmissive. Preferably, the average dimension across a major flake axis of flake in the outer layer is from about 10 to about 100 $\mu$m, more preferably 20 to 90 $\mu$m. The flake content in the dried outer layer is preferably from 0.1 to 5.0, more preferably from 0.3 to 3.0 weight percent.

The flakes of the inner layer are of relatively smaller average size than the flakes in the outer layer. Preferably, the average dimension across a major flake axis of flake in the inner layer is from about 1 to about 20 μm, more preferably 2 to 15 μm. It is preferred that the average dimension across a major flake axis of flake in the outer layer is at least three, and more preferably, at least five times that of flake in the inner layer. The coverage of metal flakes in the inner layer preferably is from about 0.01 to about 10 mg/sq. cm, more preferably from 0.10 to 1.0 mg/sq. cm. The coverage required to achieve the desired degree of opaqueness depends upon parameters such as, for example, flake size, density and surface area to weight ratio, layer thickness and the amount, if any, that the coating is to be stretched.

Each paint layer of the coated articles of this invention contains reflective flakes in addition to the polymeric binder. Useful flakes include metallic flakes such as aluminum flake, copper flake, bronze flake, copper bronze flake, nickel flake, zinc flake, magnesium flake, silver flake, gold flake and platinum flake as well as other platelets such as mica, glass, stainless steel, coated mica, coated glass, and aluminum coated polyester film fragments. Also useful are low-melting metallic flakes as disclosed in the copending application of Carroll et al, U.S. patent application Ser. No. 171,979 filed Mar. 23, 1988. Mixtures of two or more types of flakes can be used.

The coverage of the inner paint layer is sufficient that the total paint coating is opaque. By opaque, it is meant that the coating has a covering power sufficient to obscure the substrate onto which it is protectively adhered. Preferred coated articles have a mean optical density of at least 3.0. Preferably, the coated article of this invention exhibits a high degree of uniformity of optical density. More preferably, they exhibit a maximum optical density variation of less than 0.3 units from the mean density of the sheet material as measured by an optical microdensitometer trace across the article. Such measurements can be readily obtained by those skilled in the art using conventional equipment, such as a Perkin Elmer PDS Microdensitometer.

The dry thickness of the outer paint layer can range from about 0.01 to about 1.00 mm. Highly preferred is a dry thickness from 0.03 to 0.07 mm. The dry thickness of the inner layer can range from about 0.005 to about 0.50 mm. Highly preferred is a dry thickness from 0.01 to 0.03 mm. The total combined thickness of the paint layers can range from about 0.015 to about 1.50 mm. However, a preferred combined dry thickness ranges from 0.04 to 0.10 mm, primarily due to reasons of economy. Thicknesses in excess of about 1 mm are not preferred inasmuch as such coatings tend to become brittle and lose adhesion and flexibility.

The coated article of this invention preferably exhibits a distinctness of image (DOI) of at least 80 when measured in accordance with ASTM TEST E-430. Such measurements, for example, can be made on a HUNTERLAB MODEL D47R-6 DORIGON GLOSSMETER. Preferred articles of the invention exhibit a DOI of at least 85, and more preferably of at least 90. Highly preferred articles exhibit a DOI of at least 95.

The coated article of this invention preferably exhibits a 20 degree gloss of at least 80 when measured in accordance with ASTM TEST D-2457. Particularly preferred coated articles of this invention exhibit a 20 degree gloss of at least 85 and more preferably of at least 90.

Coatings made in accordance with this invention exhibit a high degree of distinctness of image, flop, gloss and good covering power, and do not exhibit an unacceptable seedy appearance. The reason for this is not completely understood at this time. While Applicant does not want to be bound by theoretical mechanisms, it is believed that this superior effect is due at least partly to the size distribution of flake in each layer of the paint coating which tends to minimize flake protrusion through the outer surface of the outer paint layer.

Each paint layer comprises a polymeric binder and reflective flakes dispersed therein. The binders for the paint layers can be the same or different and can be any film-forming binder known to be useful in formulating paint compositions. Examples of such binders and methods for the preparation thereof are described in U.S. Pat. Nos. 4,681,811; 4,403,003 and 4,220,679. Particularly useful resinous binders are acrylic polymers, polyesters, and polyurethanes.

A particularly preferred resin binder for the paint layer comprises a polyurethane. Among the polyurethanes which can be used are polymeric polyols which can be prepared by reacting polyester polyols or acrylic polyols with a polyisocyanate.

The paint compositions of the present invention can be applied to various substrates to which they adhere. The coatings can be applied by conventional means including brushing, dipping, flow coating and spraying. Coatings of the present invention can be applied over virtually any substrate including wood, metals, glass, cloth, plastic, foam, including elastomeric substrates, and can be applied over both metallic and elastomeric parts of substrates such as are found on motor vehicles. The paint compositions generally are applied to such substrates in a liquid medium.

The liquid medium of the paint composition can include solvents for the film-forming polymer and diluents which are not solvents. The solvent system may be organic or aqueous or a combination. In one preferred embodiment of the invention, the film-forming polymer is present as a latex, and the medium is a combination of water and organic solvents promoting coalescence such as N-methyl pyrrolidone. The medium may be a single compound or a mixture of compounds. Factors such as solubility, miscibility, polarity, hydrophilicity and lyophilicity may be considered. Illustrative of suitable components of the liquid medium are alcohols such as lower alcohols containing 1 to 8 carbon atoms, including methanol, ethanol, propanol, isopropanol, butanol, sec-butyl alcohol, tert-butyl alcohol, amyl alcohol, hexyl alcohol, ethers and ether alcohols such as ethylene glycol monoethyl ether, ethylene glycol monobutyl ether, ethylene glycol dibutyl ether, propylene glycol monomethyl ether, diethylene glycol monobutyl ether, diethylene glycol dibutyl ether, dipropylene glycol monoethyl ether and dipropylene glycol monobutyl ether, ketones such as methyl ethyl ketone, methyl isobutyl ketone, methyl amyl ketone and methyl n-butyl ketone, esters such as butyl acetate, 2-ethoxyethyl acetate and 2-ethylhexyl acetate, aliphatic and alicyclic hydrocarbons such as petroleum naphthas and cyclohexane, aromatic hydrocarbons such as toluene and xylene, and water. The concentration of liquid medium in the paint composition can vary over a wide range. In general, however, a rather high solids content is desirable, e.g. of the order of 20 to 60 weight percent with the balance being the liquid medium. When the latter is an aqueous medium it can be, for example, 70 to 99 percent water and the rest organic solvent or solvents.

The paint compositions optionally include a pigment or colorant incorporated in the film-forming binder. Conventional colorants used in surface coating compositions can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine green, carbazole violet, perylene reds, diazo red and the like.

Besides the polymeric vehicle, reflective flakes and optional pigment or colorant, the paint composition can contain addenda such as UV absorbers, fillers, plasticizers, antioxidants, etc. known to be useful in polymeric films.

Particularly preferred specific paint compositions are described in the Examples of Reafler, U.S. patent application Ser. No. 116,426 filed Nov. 3, 1987, the disclosure of which is hereby incorporated by reference in its entirety.

The paint coated article described above can be provided with a transparent topcoat as is typically used in basecoat/clearcoat composites.

In one preferred embodiment, the above-described paint layers can be applied to a thin, essentially planar, self-supporting stretchable thermoplastic polymeric film carrier support to provide a flexible and stretchable sheet material of the type described in the above-cited Reafler patent application. Such flexible and stretchable sheet material is particularly adapted for use in a thermoforming process in which it is stretched and bonded to a three-dimensional substrate, such as an exterior automotive panel, to form thereon a decorative coating exhibiting a high degree of geometric metamerism.

The carrier film preferably has heat softening and tensile elongation properties which adapt it to use in a thermoforming process. Preferred carrier films have substantially uniform thickness, preferably in the range of 0.05 to 0.40 mm, more preferably 0.10 to 0.30 mm. Suitable compositions for the carrier film are disclosed in U.S. patent application Ser. No. 116,426. A particularly preferred composition for the carrier film is the blend of copolyesters based on poly(1,4-cyclohexylenedimethylene terephthalate) and rubber-modified styrene maleic anhydride copolymers having at least two rubbery additives as disclosed in U.S. Pat. No. 4,582,876. Other preferred compositions for the carrier film include the blends of poly(etheresters) and polyesters disclosed in Seymour, U.S. patent application Ser. No. 151,727 filed Feb. 3, 1988.

As described in the Reafler application cited above, the paint layer can be coated on a carrier film support having thereon an adhesion-promoting tie layer which provides improved bonding strength and reduces the risk of delamination. A transparent topcoat layer can be provided over the paint layers and a suitable adhesive coated on the surface of the film support sheet opposite the paint layers. The topcoat can provide such desired properties as improved smoothness, high gloss, hardness, durability, resistance to weathering, abrasion resistance, resistance to scratching, chipping and marring, and resistance to spot damage caused by acid rain or pollution. Vacuum forming and thermoforming techniques, such as described in U.S. Pat. No. 4,769,100, preferably can be used to apply the sheet material carrying the paint layer to structural substrates, such as exterior automobile panels.

Referring now to the drawings, FIG. 1 depicts a paint coated article in accordance with this invention including substrate 10 having coated thereon inner paint layer 12 containing reflective flakes 13 and outer paint layer 14 containing reflective flakes 15 as described hereinabove. FIG. 2 illustrates a sheet material in accordance with the present invention wherein carrier film 16 has coated thereon inner paint layer 12 containing reflective flakes 13 and outer paint layer 14 containing reflective flakes 15. FIG. 3 represents a sheet material which includes adhesion promoting tie layer 18 on carrier film 16 which improves the bonding strength and reduces the risk of delamination. The sheet material is provided with inner paint layer 12 containing reflective flakes 13 and outer paint layer 14 containing reflective flakes 15 and with transparent topcoat 20.

The invention has been described in detail with particular reference to preferred embodiments thereof, but it will be understood that variations and modifications can be effected within the spirit and scope of the invention.

What is claimed is:

1. A paint-coated article having excellent distinctness of image, flop and covering power which comprises:
    a substrate,
    coated on the substrate an outer paint layer and an inner paint layer, each of said layers comprising a polymeric binder and reflective flakes dispersed therein, the flakes of said outer layer being of relatively large average size and present in a concentration such that the layer is light transmissive, the flakes of said inner layer being of relatively smaller average size, and the coverage of said inner layer being sufficient that the total paint coating is opaque and wherein the flake concentration in the outer layer is from about 0.3 to 5.0 weight percent, and wherein the average dimension across a major flake axis of flake in the outer layer is from about 10 to 100 $\mu$m, and the average dimension across a major flake axis of flake in the inner layer is from about 1 to 20 $\mu$m, with the proviso that the average dimension across a major flake axis of flake in the outer layer is at least three times that of flake in the inner layer.

2. The article of claim 1 wherein the reflective flakes are metal flakes.

3. The article of claim 2 wherein the coverage of the metal flakes in the inner layer is from about 0.01 to 10 mg/sq. cm.

4. The article of claim 2 wherein the dry thickness of the outer layer ranges from about 0.03 to 0.07 mm and the dry thickness of the inner layer ranges from about 0.01 to 0.03 mm.

5. The article of claim 2 wherein the combined thickness of the paint layers ranges from about 0.04 to 0.10 mm.

6. The article of claim 2 wherein the distinctness of image is at least 80 when measured in accordance with ASTM TEST E-430.

7. The article of claim 2 wherein the 20 degree gloss is at least 80 when measured in accordance with ASTM TEST D-2457.

8. A flexible and stretchable sheet material adapted for use in a thermoforming process in which it is stretched and bonded to a three-dimensional substrate to form thereon a decorative coating exhibiting a high degree of geometric metamerism, said sheet material comprising:

(1) a thin, essentially planar, stretchable thermoplastic polymeric carrier film of uniform thickness; said carrier film having heat-softening and tensile elongation properties which adapt it to use in said thermoforming process; and (2) a thin coating of paint of substantially uniform thickness on one surface of said thermoplastic polymeric support, said paint coating comprising an outer layer and an inner layer, each of said layers comprising a polymeric binder and reflective flakes dispersed therein, the flakes of said outer layer being of relatively large average size and present in a concentration such that the layer is light transmissive, the flakes of said inner layer being of relatively smaller particle size, and the coverage of said inner layer being sufficient that the total paint coating is opaque and wherein the flake concentration in the outer layer is from about 0.3 to 5.0 weight percent, and wherein the average dimension across a major flake axis of flake in the outer layer is from about 10 to 100 $\mu$m, and the average dimension across a major flake axis of flake in the inner layer is from about 1 to 20 $\mu$m, with the proviso that the average dimension across a major flake axis of flake in the outer layer is at least three times that of flake in the inner layer.

* * * * *